United States Patent Office 3,163,901
Patented Jan. 5, 1965

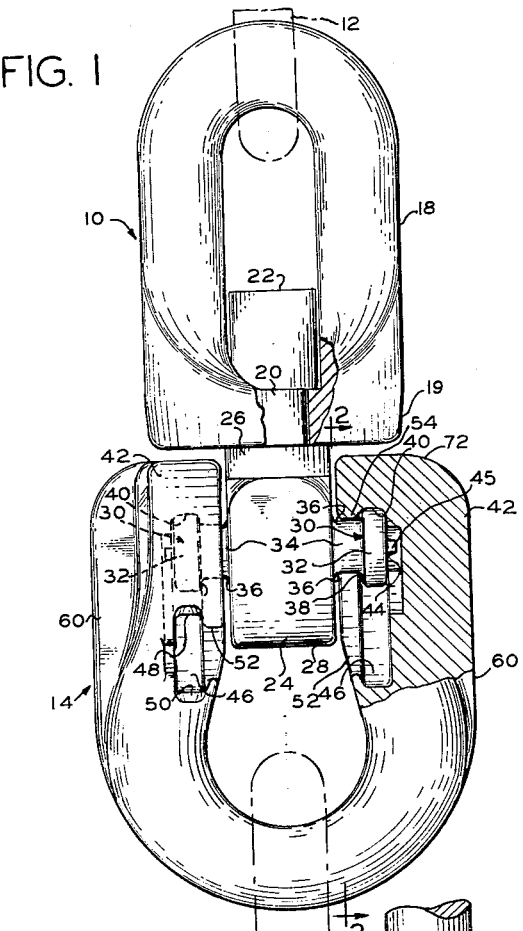

3,163,901
CARGO HOOK
Franklin M. Brawand, 7706 SW. Florence Lane,
Portland, Oreg.
Filed June 5, 1963, Ser. No. 285,766
10 Claims. (Cl. 24—123)

This invention relates to a safety draft hook, and more particularly to a draft hook which cannot be accidentally detached when bearing a load.

An object of the invention is to provide a draft hook for hoisting slingborne loads, other borne loads or dragging loads which cannot be detached from the load during operation thereof.

Another object of the invention is to provide a draft hook which may be separated into two component parts, a draft line terminal member and a load line holder in which the holder and the member may be detached from each other easily when there is no load on the holder, but which prevent accidental detachment while there is a load on the holder.

A further object of the invention is to provide a simple, accident-proof draft hook of very rugged construction.

The present invention provides a safety draft hook having a U-shaped load line holder having heavy ends provided with sockets and undercut slots leading from the sockets along the inside of the arms of the holder together with a draft line terminal member comprising a block adapted to fit between the ends of the load line holder and carrying headed pins projecting from opposite faces thereof and adapted to lock in the sockets in the load line holder. Preferably the load line holder is provided with enlarged flange portions on the outside portions of the ends thereof which serve to impart strength thereto and also act as handles for manipulating the load line holder. The block is adapted to project beyond the sides of the load line holder to protect the load line holder against accidental bumping when the load line holder extends generally at right angles to the draft line terminal member. There also may be provided keys on the pins and locking slots in the load line holder receiving the keys and preventing movement of the load line holder away from the block when the load line holder is in a load carrying position.

A complete understanding of the invention may be obtained from the following detailed description of a draft hook forming a specific embodiment thereof, when read in conjunction with the appended drawings, in which:

FIG. 1 is a front elevation view, with portions thereof broken away and shown in partial section, of a draft hook forming one embodiment of the invention;

FIG. 2 is an enlarged, fragmentary, vertical section taken along line 2—2 of FIG. 1;

FIG. 3 is a fragmentary side elevation view of the draft hook of FIG. 1; and

FIG. 4 is a side elevation view of a portion of the draft hook of FIG. 1.

Referring now in detail to the drawings, there is shown therein a draft hook including a swivel type draft line terminal member 10 connected to a draft line 12 attached to a winch of a crane or other drafting machine, and a rigid load line holder 14 detachable from the member 10 and adapted to hold one or more load cables 16. The device 10 includes an eye or link portion 18 having a strong cylindrical base 19 to which is swiveled a heavy pin 20 having an enlarged head 22 fixed to the upper end thereof, as viewed in FIG. 1. The cylindrical base 19 of the line terminal member provides a shoulder portion. Formed integrally with the heavy pin 20 is a block 24 having a collar portion 26 at the upper end thereof and a rounded nose portion 28 at the lower end thereof. Pins 30 having enlarged heads 32 and smaller shank portions 34 joined integrally to the block 24 are axially aligned with each other. The heads 32 and shank portions 34 are concentric with one another. The shank portions 34 are joined to the block and include fillets 36 at the junctures thereof to the blocks. Fillets 38 are provided at the junctures of the reduced portions 34 with the enlarged heads 32.

The exterior peripheries of the heads 32 are annular in shape, as best illustrated in FIGS. 1 and 2, and are adapted to fit into undercut sockets 40 formed in enlarged end portions 42 of the U-shaped load line holder 14. The head portions 32 have flat outer faces 44 from which project elongated keys on bars 45 centered on the longitudinal axis of the pens 30. The enlarged end portions 42 are provided with undercut slots 46 in the inner faces thereof and have flared end portions 48 and 50 defining an enlarged mouth. The width of the slots 46 is just slightly greater than the diameter of the enlarged heads 32 to permit the heads to travel therethrough and, as illustrated in FIG. 2, the slot 46 extends slightly to the left from the socket 40 and then curves back to the right to the side of the end portion 42. The end portions 42 have overhanging, opposed flanges 52 which extend to an arcuate flange portion 54 concentric with the socket 40. The diameter of the flange 54 is slightly greater than the diameter of the shank portion 34 so that the load is always borne between the head portion 32 and the socket 40 rather than by the flanges 54. The flanges 52 extending along the slots 46 are substantially parallel to one another and are spaced apart a distance slightly greater than the diameter of the reduced shank portions 34 of the pins to provide clearance for the shank portions 34.

The enlarged end or head portions 42 are provided with strengthening central flanges or webs 60 which, in addition to strengthening the member 14, also act as easily grasped handles to facilitate manipulation of the holder 14. Projecting portion 64 of the socket causes the heads 32 of the pins 30 to be locked in the sockets 40 and require a slightly complex movement to remove the holder 14 from the member 10. The flanges 52 have tapered entrance portions 66 to facilitate entrance of the heads 32 into the slots 46.

To insure that the holder 14 cannot be removed from the member 10 when there is any load on the holder 14, locking slots 67 are provided in the holder for locking the keys 45 to the holder. The slots 67 have cylindrical socket portions 69 of a diameter slightly greater than the length of each key 45 and centered relative to the sockets 40. Constricted neck portions 71 of the slots 67 are of a width much less than the length of each key but substantially greater than the width of each key. The keys extend transversely of the length of the member 10 so that, to permit the holder 14 to be removed, the holder must be pivoted to a positon substantially at right angles to the member 10.

To attach the holder 14 to the member 10 the member 14 must be placed at right angles to the member 10 and is slid immediately over the pins 30, after which the holder 14 is released and swings to a locked or unremovable position. Arcuate ends 72 of the arms of the member 14 are concentric with the sockets 40 and permit free pivoting of the member 14 relative to the member 10 from the full line position of the member 14, as shown in FIG. 3, to the position thereof shown in FIG. 1. Whenever the member 14 is pivoted to angular position relative to the member 10, the arcuate nose portion 28 of the block 24 projects below the member 14 so that, if anything strikes the draft hook, it will strike the block 24 rather than the holder 14. This protects the holder 14, the block 24 being considerably more massive than the holder 14, so that damage thereto is prevented.

With the holder 14 in the position shown in FIG. 3, to remove the holder 14, it is lifted slightly to clear the locking projections 64 and the member 14 is slid to the right off the pins 30. When the member 10 and holder 14 are separated, they may be attached by the reverse procedure.

The above described draft hook is very strong and rugged, and the holder 14 may not be separated accidentally from the member 10 when a load is applied to the member 14, it requiring substantially a 90° movement of the member 14 relative to the member 10 to place the member 14 in releasing position relative to the holder 10.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a draft hook,
an elongated draft line member including a block and a pair of aligned pins projecting from the block,
and a U-shaped load line holder provided with arms having opposed, aligned first sockets therein and parallel, arcuate, first slots leading from the sockets permitting movement of the pins through the slots to the sockets,
the ends of the pins being provided with parallel, elongated keys extending across the ends of the pins transverse to the longitudinal axis of the draft line member,
the arms having locking sockets concentric with the first sockets, second slots generally parallel with the first slots and of a width sufficient to clear the keys and constricted portions joining the locking sockets and second slots adapted to prevent movement of the locking sockets away from the keys except when the holder is in a position substantially at right angles relative to the member.

2. In a draft hook,
a U-shaped load line holder having a lower central portion of a predetermined area in cross section and also provided with upwardly extending arms having enlarged end portions each substantially larger in cross sectional area than said predetermined area,
the end portions being provided with opposed undercut sockets and parallel, arcuate, undercut grooves extending from one side of the holder to the sockets,
and a draft line member having a block movable between the arms and having a pair of aligned, headed pins having shanks and adapted to travel along the grooves and seat in the sockets,
the draft line member also being provided with stop means limiting longitudinal movement of the holder relative thereto when the holder is not in a position forming a substantial angle with the draft member.

3. The draft hook of claim 2 wherein
the pins are provided at the ends thereof with a pair of parallel elongated keys extending transversely of the pins,
the arms being provided with locking sockets concentric with the undercut sockets,
the arms also having clearance slots generally parallel to the grooves to permit passage of the keys therethrough and having constricted end portions joining the locking sockets for permitting only endwise movement of the keys therethrough.

4. The draft hook of claim 2 wherein
the grooves extend from the sockets initially away from said one side of the holder and then curve back to said one side of the holder to require the holder to be moved first toward the stop means and then generally parallel to said one side for releasing the holder from the member.

5. In a draft hook,
a U-shaped load line holder having a lower central portion of a predetermined area in cross section and also provided with upwardly extending arms having enlarged end portions each substantially larger in cross sectional area than said predetermined area,
the end portions being provided with opposed sockets having rounded annular peripheries of a predetermined diameter and arcuate flanges concentric with the annular peripheries and of an inner diameter substantially less than said predetermined diameter,
the end portions also being provided with a pair of parallel undercut curved grooves extending downwardly from the sockets and laterally of the arms to the edges of the arms,
a draft line block movable between the arms and having a pair of aligned, headed pins having shanks of a diameter slightly less than the inner diameter of the arcuate flanges,
a link member supporting the block rotatably and having an abutment end spaced upwardly from the pins,
the pins also having enlarged heads concentric with the shanks having rounded annular peripheries complementary to the rounded annular peripheries of the sockets,
the heads being provided with flat exterior faces,
the pins having fillets between the shanks and the block and between the shanks and the head,
the grooves having enlarged mouths,
the arms having flanges extending over the edges of the grooves,
the flanges being tapered at the entrance and portions thereof,
the end portions of the arms having on the exteriors thereof wide flanges serving as handles and to strengthen the end portions of the arms,
the ends of the end portions of the arms being arcuately concentric to the sockets,
the abutment end being so spaced from the pins and the grooves being so positioned in the arms that releasing movement of the holder relative to the block is possible only when the holder is at right angles to the link member.

6. The draft hook of claim 5 wherein
the block has an arcuate end portion adapted to project beyond the arms when the holder is positioned angularly relative to the block.

7. In a draft hook,
a line terminal member including a block portion of a predetermined width, and aligned pins projecting from opposite sides of the block portion,
and a U-shaped line holder having a pair of arms,
the free end portions of the arms being so spaced from each other as to permit movement of the end portions of the arms along opposite sides of the block member,
the end portions of the arms having aligned sockets for receiving the pins and also being provided with entrance slots extending from the sockets in a direction away from the free ends of the arms and permitting lateral movement of the pins therethrough to and from the sockets,
the line terminal member having a shoulder portion overhanging at least one of the pins and spaced laterally from the pins a distance such as to be engaged by the free end of at least one of the arms and prevent movement of the pins through the slots when the U-shaped line holder is in a position extending directly away from the line terminal member and to permit longitudinal movement of the line holder relative to the terminal member in which the slots move over the pins when the line holder is in a position forming a substantial angle with the longitudinal axis of the line holder.

8. The draft hook of claim 7 wherein the free ends of the arms of the line holder are rounded to permit pivoting of the line holder on the pins to said substantial angle.

9. In a draft hook,
a U-shaped line holder having a pair of arms,
the free end portions of the arms being spaced apart a first predetermined distance and having opposed, generally U-shaped, pin-receiving recesses extending away from the free ends of the arms to entrance portions thereof,
the closed end of each of the U-shaped recesses being spaced from the free ends of the arms a second predetermined distance,
and a draft line member having a block movable between the arms of the line holder and also including a pair of aligned pins extending from opposite sides of the block and adapted to move laterally thereof along the recess to and from the closed ends of the recesses,
the draft line member also being provided with shoulder means spaced along the block from the pins a distance slightly greater than said second predetermined distance for preventing engaging or disengaging movement of the line holder relative to the draft line member except when the line holder is in a position extending at a substantial angle relative to the draft line member.

10. The draft hook of claim 9 wherein the shoulder means includes an enlarged head portion overhanging the major portions of the free ends of the arms of the line holder.

References Cited in the file of this patent
UNITED STATES PATENTS

| | | |
|---|---|---|
| 534,165 | Lee | Feb. 12, 1895 |
| 1,321,356 | Bateman | Nov. 11, 1919 |
| 2,259,880 | Ehmann | Oct. 21, 1941 |
| 2,291,649 | Roberts | Aug. 4, 1942 |
| 2,420,156 | MacKenzie | May 6, 1947 |
| 2,810,297 | Drewrys | Oct. 22, 1957 |
| 2,889,167 | Brawand | June 2, 1959 |

UNITED STATES PATENT OFFICE
CERTIFICATE OF CORRECTION

Patent No. 3,163,901 January 5, 1965

Franklin M. Brawand

It is hereby certified that error appears in the above numbered patent requiring correction and that the said Letters Patent should read as corrected below.

Column 4, line 19, for "haivng" read -- having --; column 6, line 19, for "2,420,156" read -- 2,420,256 --.

Signed and sealed this 11th day of May 1965.

(SEAL)
Attest:

ERNEST W. SWIDER
Attesting Officer

EDWARD J. BRENNER
Commissioner of Patents